United States Patent
Zagorsky et al.

(10) Patent No.: US 9,391,936 B2
(45) Date of Patent: *Jul. 12, 2016

(54) SYSTEM AND METHOD FOR SPAM FILTERING USING INSIGNIFICANT SHINGLES

(71) Applicant: Kaspersky Lab ZAO, Moscow (RU)

(72) Inventors: Sergey G. Zagorsky, Moscow (RU);
Darya V. Loseva, Moscow (RU);
Vladimir A. Skvortsov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 5 days.

This patent is subject to a terminal disclaimer.

(21) Appl. No.: 14/623,977

(22) Filed: Feb. 17, 2015

(65) Prior Publication Data

US 2015/0163183 A1 Jun. 11, 2015

Related U.S. Application Data

(63) Continuation of application No. 14/069,889, filed on Nov. 1, 2013, now Pat. No. 8,996,638.

(30) Foreign Application Priority Data

Jun. 6, 2013 (RU) ................................. 2013125984

(51) Int. Cl.
| | |
|---|---|
| *G06F 15/16* | (2006.01) |
| *H04L 12/58* | (2006.01) |
| *H04L 12/26* | (2006.01) |
| *G06F 17/30* | (2006.01) |

(52) U.S. Cl.
CPC .......... *H04L 51/12* (2013.01); *G06F 17/30345* (2013.01); *H04L 43/04* (2013.01); *H04L 51/32* (2013.01)

(58) Field of Classification Search
None
See application file for complete search history.

(56) References Cited

U.S. PATENT DOCUMENTS

| | | |
|---|---|---|
| 7,899,866 B1 | 3/2011 | Buckingham et al. |
| 2004/0073617 A1 | 4/2004 | Milliken at el. |
| 2005/0060643 A1 | 3/2005 | Glass et al. |
| 2008/0219495 A1 | 9/2008 | Hulten et al. |
| 2011/0055332 A1 | 3/2011 | Stein |
| 2012/0078719 A1 | 3/2012 | Bhagwan et al. |
| 2012/0096553 A1 | 4/2012 | Srivastava et al. |

FOREIGN PATENT DOCUMENTS

| | | |
|---|---|---|
| RU | 2355018 C2 | 5/2009 |
| RU | 85247 U1 | 6/2009 |
| RU | 2474870 C1 | 2/2013 |

*Primary Examiner* — Scott B Christensen
(74) *Attorney, Agent, or Firm* — Arent Fox LLP; Michael Fainberg

(57) ABSTRACT

Disclosed system and methods for detecting spam using shingles. An example system identifies in a received message one or more insignificant text portions based on a text pattern database storing defined insignificant text patterns not containing spam; removes at least a portion of the one or more identified insignificant text portions from the message to generate an abridged and canonized message; generates a set of shingles from the abridged and canonized message; identifies in the set of shingles one or more shingles based on a shingles database storing defined insignificant shingles that occur only in messages not containing spam; removes one or more identified shingles from the set of shingles to generate a reduced set of shingles upon detecting the one or more identified shingles matching at least one of the defined insignificant shingles; and determines whether the received message contains spam based on the reduced set of shingles.

20 Claims, 4 Drawing Sheets

SYSTEM AND METHOD FOR SPAM FILTERING USING INSIGNIFICANT SHINGLES

CROSS-REFERENCE TO RELATED APPLICATIONS

This application is a continuation of U.S. application Ser. No. 14/069,889, filed on Nov. 1, 2013, which claims benefit of priority under 35 U.S.C. 119(a)-(d) to a Russian Application No 2013125984 filed on Jun. 6, 2013, which is incorporated by reference herein.

TECHNICAL FIELD

The disclosure relates generally to the field of information security, and more specifically to systems and methods for spam filtering using shingles.

BACKGROUND

Advertising on the Internet is one of the cheapest forms of advertising. Spam is a mass mailing of advertising or other form of information to people who have not expressed a desire to receive it. Spam includes messages sent by electronic mail, instant messaging protocols, in social networks, blogs, dating sites, forums, and also SMA and MMS messages. Spam messages have become the main and most large-scale form of advertising in the modern world, which take up around 70-90% of the total volume of global mail traffic.

Given the continual growth in volumes of spam mailing, problems of a technical, economic and criminal nature arise. The excess network traffic caused by spam message may overload data transmission channels and network equipment, review and handling of spam messages waists users time, the use of spam messages to perpetrate fraud and thievery—these and other aspects show the acute need for a combat spam.

Many methods exist for counteracting spam mailings. One of the most effective is the use of anti-spam applications, which detect, filter and remove unwanted spam messages. One of the key conditions for spam filtering is to avoid false spam detections, which may involve the blocking of legitimate messages. For example, the method using black lists, which essentially involves removing messages arriving from addresses contained in a black list, provides 100% filtering of messages from blacklisted addresses. However, when addresses of ordinary users mistakenly end up on the black list, a false spam detection may occur and legitimate messages may be filtered out and not delivered to their destination.

Another method of counteracting spam is using content filtering, which involves the use of special spam filters that analyze the constituent parts of messages, including graphics. From the results of the analysis, a lexical vector or a spam weight of the message may be calculated, which can be used to determine whether the message is spam or not.

Another method spam detection technique is message clustering, which allows the detection in the mail flow of mass messages that are absolutely identical or that differ slightly. The drawback of this method is that the majority of legitimate services, such as news subscription or update services for example, also employ mass mailing and, consequently, can be incorrectly recognized as sources of a spam mailing when this method is used.

Anti-spam laboratories are engaged in creating and improving the filtering rules used by spam filters. At the same time, the people engaged in spam mailing are constantly making attempts to bypass the protection of spam filters. The existing methods of counteracting spam have a number of shortcomings and cannot fully resolve the problem.

Therefore, there is a need to improve spam detection techniques.

SUMMARY

Disclosed systems, methods and computer program products for detecting spam using shingles. In one aspect, an example system identifies in a received message one or more insignificant text portions based on a text pattern database storing defined insignificant text patterns not containing spam; removes at least a portion of the one or more identified insignificant text portions from the message to generate an abridged and canonized message; generates a set of shingles from the abridged and canonized message; identifies in the set of shingles one or more shingles based on a shingles database storing defined insignificant shingles that occur only in messages not containing spam; removes one or more identified shingles from the set of shingles to generate a reduced set of shingles upon detecting the one or more identified shingles matching at least one of the defined insignificant shingles; and determines whether the received message contains spam based on the reduced set of shingles.

In one aspect, the defined insignificant text patterns comprise a plurality of words, phrases, symbols that occur only in messages not containing spam.

In one aspect, the system further collect from known users messages not containing spam; identifies in the collected messages insignificant text patterns and shingles; and stores the identified insignificant text patterns and insignificant shingles in each respective text pattern database and shingles database.

In one aspect, removing at least the portion of the one or more identified insignificant text portions from the message to generate the abridged message is performed upon detecting the one or more identified insignificant text portions matching at least one of the defined insignificant text patterns.

In one aspect, each defined insignificant text pattern comprises a text pattern, text identification information and a usage frequency, and each defined insignificant shingle comprises a hash, a shingle pattern, a text portion corresponding to the shingle pattern, and a usage frequency.

In one aspect, determining whether the received message contains spam comprises performing spam filtering of the reduced set of shingles using a Bayes method.

In one aspect, determining whether the received message contains spam comprises performing spam filtering of the reduced set of shingles using a duster filtering method.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one

DETAILS DESCRIPTION

Example aspects of the present invention are described herein in the context of system, method and computer program product for detection and filtering of spam messages using shingles. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

For example, when an anti-spam application processes electronic mail messages using message clustering technique, in which sets of objects are constructed from the text of the message. Then, the anti-spam application compares already known sets of objects containing spam and sets of objects not containing spam. Based on the reputation of the objects, the anti-spam application determines whether the analyzed message is spam. The objects used in comparison may be words, phrasing, shingles, convolutions, and so on. As used herein, the term "shingle" refers to a contiguous sequence of symbols, letters or words from the analyzed message text, which are also known as n-grams, for which, in one aspect, a hash or control sum may be is computed using known methods, and which are used to gauge the similarity of significant message texts portions with shingles associated with spam messages.

Figure 1:
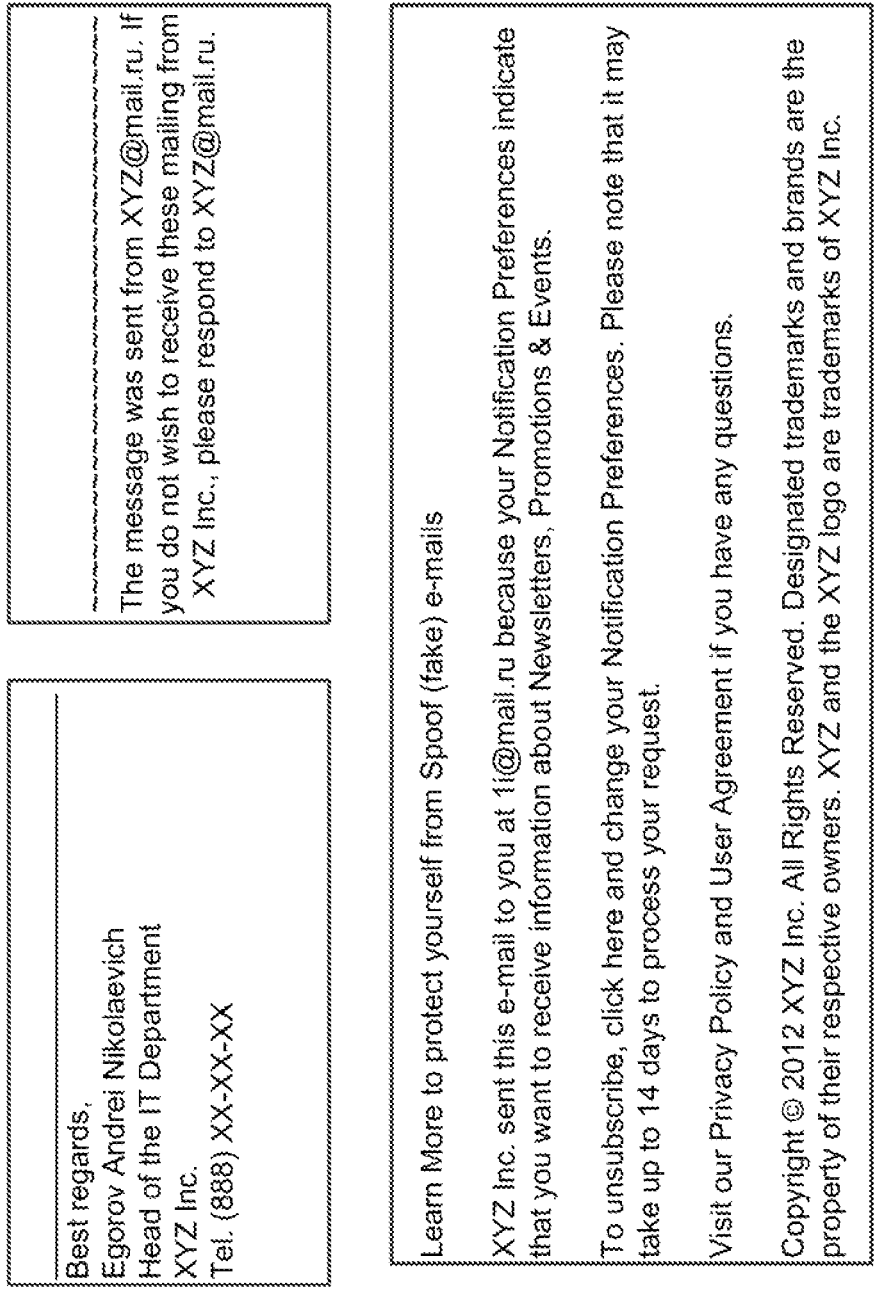
FIG. 1 illustrates examples of insignificant text in the form of signatures and automatic signatures.

In one aspect, in order to generate a set of shingles, the text of the analyzed message may be first divided sequences of words. As known to those of ordinary skill in the art, the algorithm used for comparison of the shingles may depend on the method of counting the shingles and the length of each shingle. In the course of processing the message, the anti-spam application may identify certain text portions that do not have significance in identifying spam, but which are generally not removed when generating the shingles. One such insignificant text portion may, for example, be a signature, such as an auto-signature. An auto-signature is part of an electronic text message that contains information about the sender or any service information about the server or the message. The auto-signatures are typically generated and inserted in messages automatically. FIG. 1 shows examples of insignificant text portions, such as signatures and auto-signatures. Other examples of insignificant text may include, but not limited to parts of the message containing the mailing address and telephone, the post script, and so on, which are found in business correspondence and are of a formal nature. Removing the aforementioned examples of insignificant text of messages makes it possible to get rid of parts of the message that have no significance in the spam filtering, which increases the efficiency and accuracy of the further message processing.

Figure 2:
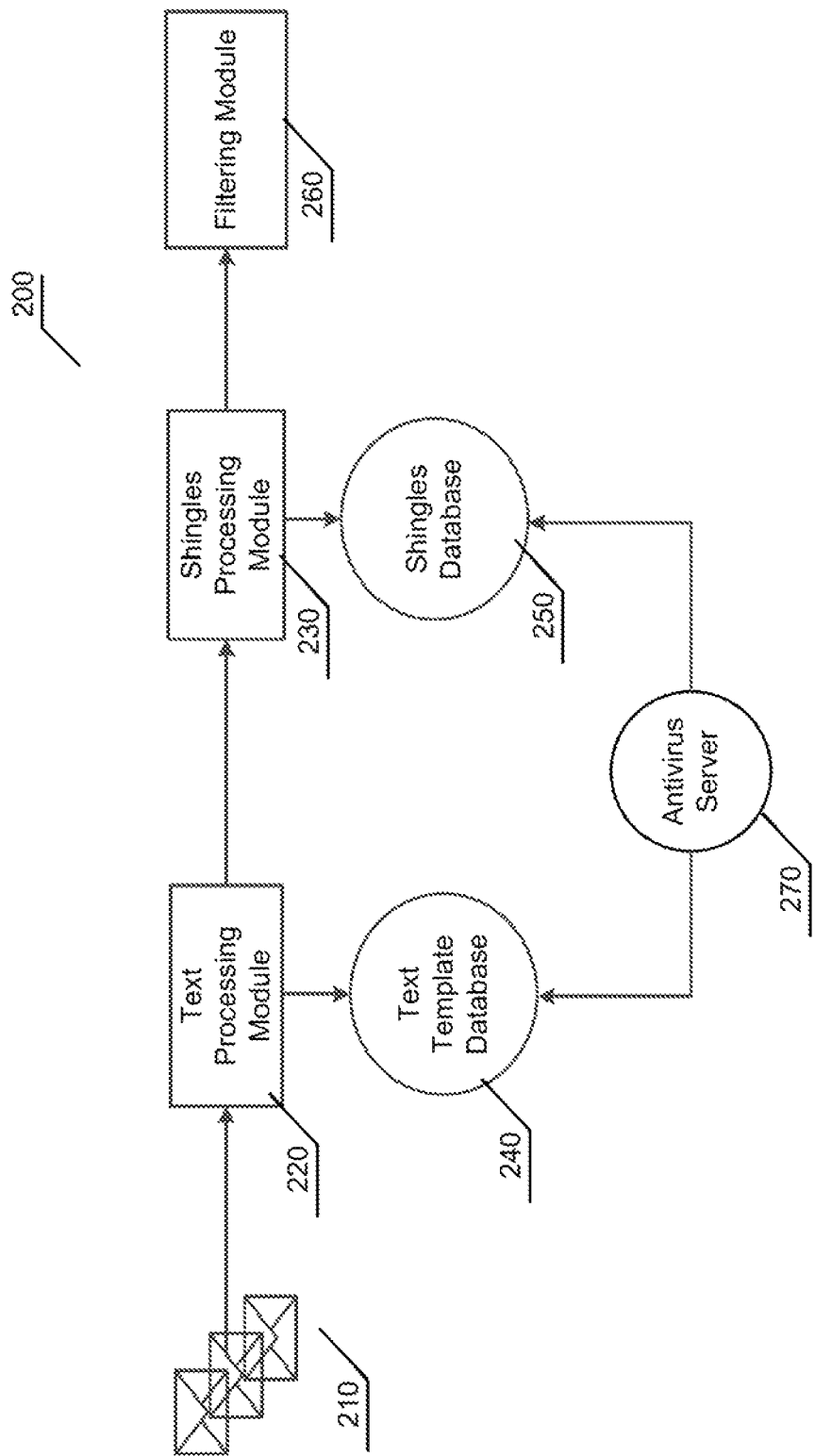
FIG. 2 illustrates a diagram of an example system for spam filtering using shingles according to aspects of the present invention.

FIG. 2 shows an example implementation of a system for spam filtering according to aspect of the present invention. In one aspect, the system 200 is configured to remove shingles from insignificant parts of a message during spam filtering. The system 200 may be implemented in an anti-spam application. The system 200 may include a text processing module 220, a shingles processing module 230, a filtering module 260, a text pattern database 240 and a shingles database 250. The text processing module 220 is configured to receive text messages 210, search for insignificant parts of text that is to be removed by analysing the text of the message 210 for the presence of known insignificant text patterns kept in the text pattern database 240, remove the found insignificant text portions from the message 210, canonize the abridged message text and send the abridged message text to the shingles processing module 230. The shingles processing module 230 is configured to generate using known methods a set of shingles from the abridged message text, search for shingles that are to be removed by comparing the shingles from the generated set of shingles to the shingles stored in the shingles database 250, remove the shingles that match, and send the abridged set of shingles to the filtering module 260. The filtering module 260 may be configured to filter the abridged set of shingles by one of the filtering methods,, such as the clustering method, the Bayes method, or other methods known to those of ordinary skill in the art. The text pattern database 240 is configured to store text patterns that occurred only in messages not containing spam and that are characteristic of insignificant parts of a message. The shingles database 250 is configured to store information on the shingles that occurred only in messages not containing spam and that are characteristic of insignificant parts of a message.

In one example aspect, the insignificant text patterns stored in database 240 may include words, phrases, symbols or collections of words, phrases and symbols that occurred only in messages not containing spam. The distinguishing nature and significance of the text patterns is explained by expert appraisal and on the basis of statistical computations, In one example aspect, the canonization of text includes reducing the text of abridge message to a unified standardized form. The text may be cleared of prepositions, conjunctions, punctuation marks, HTML tags, and other "garbage" that should not take part in generation of shingles. Also during the canonization, substantives may be placed in the nominative case in the singular form or only their word roots are left in place.

For the text pattern database 240 and the shingles database 250 one can use various types of database, such as: hierarchical (IMS, TOMS, System 2000), network (Cerebrum, Cronospro, DBVist), relational (DB2, Informix, Microsoft SQL Server), object-oriented (Jasmine, Versant, POET), object-relational (Oracle Database, PostgreSQL, FirstSQL/J), functional, etc.

In one example aspect, the text pattern database 240 may have form of Table 1.

TABLE 1

| ID of pattern | Text pattern | Text identification | Frequency |
|---|---|---|---|
| 1 | best + regards | Auto-signature | 7594 |
| 2 | st +« number» | Address | 51442 |
| . | . | . | . |
| . | . | . | . |
| . | . | . | . |
| n | Text pattern n | Identification of Text n | Frequency n |

In one example aspect, the shingles database 250 may have form of Table 2.

TABLE 2

| ID of shingle | Shingle | Text portion | Frequency |
|---|---|---|---|
| 1 | 1bc29b36f623ba82aaf6724fd3b16718 | Auto-signature | 88451 |
| 2 | 026f8e459c8f89ef75fa7a78265a0025 | Post script | 54644 |
| . | . | . | . |
| . | . | . | . |
| . | . | . | . |
| m | Shingle m | Text portion m | Frequency m |

In one example aspect, the information for text pattern database 240 and the shingles database 250, including text patterns and shingles from messages not containing spam sent from legitimate users may be provided from a remote server 270 of an antivirus company.

Figure 3:
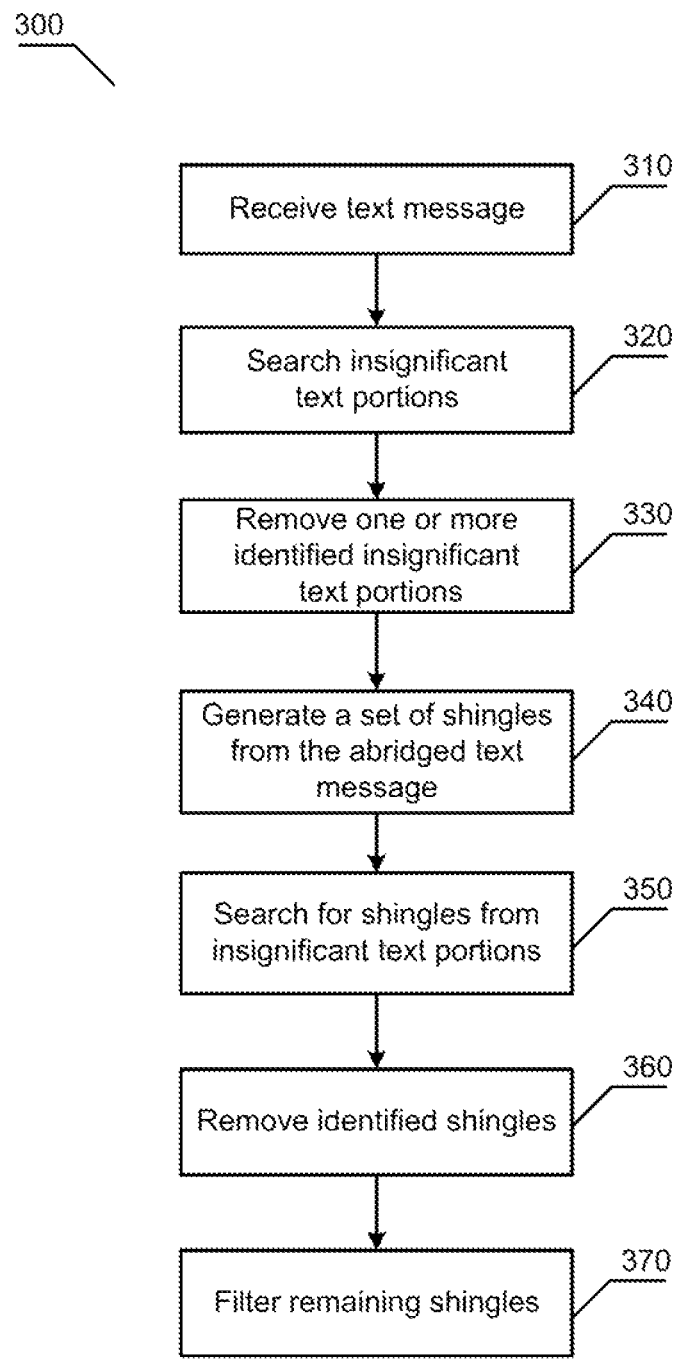
FIG. 3 illustrates a flow diagram of an example method of spam filtering using shingles according to aspects of the present invention.

FIG. 3 shows an example method 300 of spam filtering according to aspect of the present invention. At step 310, an incoming electronic message is received by the text processing module 220. At step 320, the text processing module 220 performs a search for insignificant parts of the text that are to be removed by analyzing the message text for presence of text patterns kept in the text pattern database 240. At step 330, the text processing module 220 removes parts of the message in which known text patterns were found from the text pattern database 240, and sends an abridged message text to the shingles processing module 230. Also in step 330, the text processing module 220 may perform canonization of the text of the abridged message if necessary. At step 340, the shingles processing module 230 generates a set of shingles from on the abridged message text. At step 350, the shingles processing module 230 performs a search for shingles to be removed by comparing the shingles from the generated set of shingles to known shingles that are kept in the shingles database 250. At step 360, the shingles processing module 230 removes the matching shingles and sends the abridged set of shingles to the filtering module 260. At step 370, the filtering module 260 performs a filtering of the abridged set of shingles by one of the filtering methods, such as the clustering method, the Bayes method, and so on.

Figure 4:
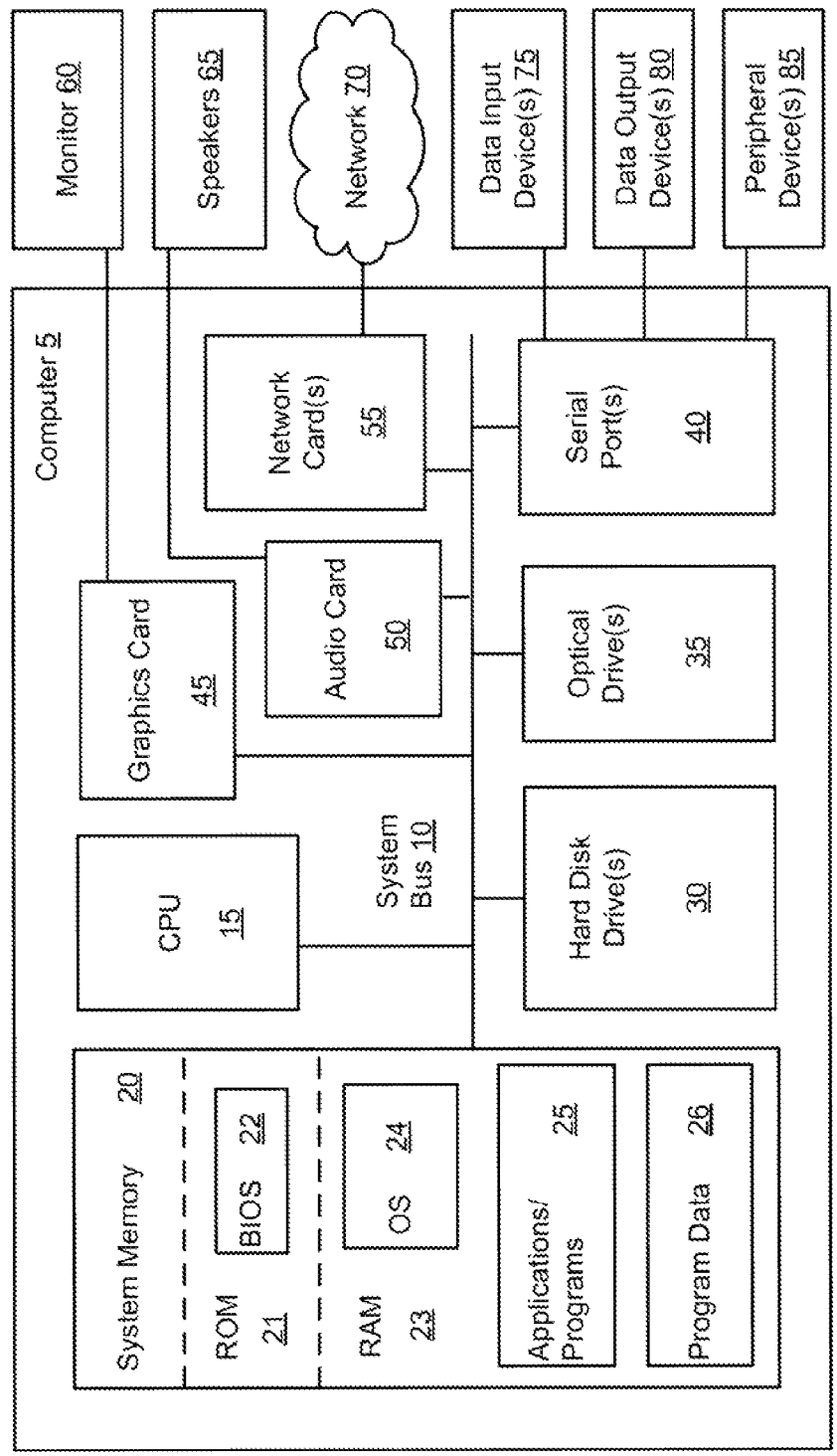
FIG. 4 is a block diagram illustrating an example general-purpose computer system in accordance with aspects of the present invention.

FIG. 4 depicts an example configuration of a general-purpose computer 5 that can be used to implement the disclosed system and methods for spam filtering. The computer system 5 may include, but not limited to, a personal computer, a notebook, tablet computer, a smart phone, a network server, a router, or other type of computing device. As shown, computer system 5 may include one or more hardware processors 15, system memory 20, one or more hard disk drivels) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may he implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 7 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting spam in a message, the method comprising:
   identifying in a received message one or more insignificant text portions based on a text pattern database storing defined insignificant text patterns not containing spam;
   removing at least a portion of the one or more identified insignificant text portions from the message to generate an abridged and canonized message;
   generating a set of shingles from the abridged and canonized message;
   identifying in the set of shingles one or more shingles based on a shingles database storing defined insignificant shingles that occur only in messages not containing spam;
   removing one or more identified shingles from the set of shingles to generate a reduced set of shingles upon detecting the one or more identified shingles matching at least one of the defined insignificant shingles; and
   determining whether the received message contains spam based on the reduced set of shingles.

2. The method of claim 1, wherein the defined insignificant text patterns comprise a plurality of words, phrases, symbols that occur only in messages not containing spam.

3. The method of claim 2, further comprising:
   collecting from known users messages not containing spam;
   identifying in the collected messages insignificant text patterns and shingles; and
   storing the identified insignificant text patterns and insignificant shingles in each respective text pattern database and shingles database.

4. The method of claim 1, wherein removing at least the portion of the one or more identified insignificant text portions from the message to generate the abridged message is performed upon detecting the one or more identified insignificant text portions matching at least one of the defined insignificant text patterns.

5. The method of claim 1, wherein each defined insignificant text pattern comprises a text pattern, text identification information and a usage frequency, and each defined insignificant shingle comprises a hash, a shingle pattern, a text portion corresponding to the shingle pattern, and a usage frequency.

6. The method of claim 1, wherein determining whether the received message contains spam comprises performing spam filtering of the reduced set of shingles using a Bayes method.

7. The method of claim 1, wherein determining whether the received message contains spam comprises performing spam filtering of the reduced set of shingles using a cluster filtering method.

8. A computer system for detecting spam, the system comprising:
   a processor configured to:
      identify in a received message one or more insignificant text portions based on a text pattern database storing defined insignificant text patterns not containing spam;
      remove at least a portion of the one or more identified insignificant text portions from the message to generate an abridged and canonized message;
      generate a set of shingles from the abridged and canonized message;
      identify in the set of shingles one or more shingles based on a shingles database storing defined insignificant shingles that occur only in messages not containing spam;
      remove one or more identified shingles from the set of shingles to generate a reduced set of shingles upon detecting the one or more identified shingles matching at least one of the defined insignificant shingles; and
      determine whether the received message contains spam based on the reduced set of shingles.

9. The system of claim 8, wherein the defined insignificant text patterns comprise a plurality of words, phrases, symbols that occur only in messages not containing spam.

10. The system of claim 9, wherein the processor is further configured to:
    collect from known users messages not containing spam;
    identify in the collected messages insignificant text patterns and shingles; and
    store the identified insignificant text patterns and insignificant shingles in each respective text pattern database and shingles database.

11. The system of claim 8, wherein removing at least the portion of the one or more identified insignificant text portions from the message to generate the abridged message is performed upon detecting the one or more identified insignificant text portions matching at least one of the defined insignificant text patterns.

12. The system of claim 8, wherein each defined insignificant text pattern comprises a text pattern, text identification information and a usage frequency, and each defined insignificant shingle comprises a hash, a shingle pattern, a text portion corresponding to the shingle pattern, and a usage frequency.

13. The system of claim 8, wherein determining whether the received message contains spam comprises performing spam filtering of the reduced set of shingles using a Bayes method.

14. The system of claim 8, wherein determining whether the received message contains spam comprises performing spam filtering of the reduced set of shingles using a cluster filtering method.

15. A computer program product stored on a non-transitory computer-readable storage medium, the computer program product comprising computer-executable instructions for detecting spam, including instructions for:
- identifying in a received message one or more insignificant text portions based on a text pattern database storing defined insignificant text patterns not containing spam;
- removing at least a portion of the one or more identified insignificant text portions from the message to generate an abridged and canonized message;
- generating a set of shingles from the abridged and canonized message;
- identifying in the set of shingles one or more shingles based on a shingles database storing defined insignificant shingles that occur only in messages not containing spam;
- removing one or more identified shingles from the set of shingles to generate a reduced set of shingles upon detecting the one or more identified shingles matching at least one of the defined insignificant shingles; and
- determining whether the received message contains spam based on the reduced set of shingles.

16. The product of claim 15, wherein the defined insignificant text patterns comprise a plurality of words, phrases, symbols that occur only in messages not containing spam.

17. The product of claim 16, further comprising instructions for:
- collecting from known users messages not containing spam;
- identifying in the collected messages insignificant text patterns and shingles; and
- storing the identified insignificant text patterns and insignificant shingles in each respective text pattern database and shingles database.

18. The product of claim 15, wherein removing at least the portion of the one or more identified insignificant text portions from the message to generate the abridged message is performed upon detecting the one or more identified insignificant text portions matching at least one of the defined insignificant text patterns.

19. The product of claim 15, wherein each defined insignificant text pattern comprise text pattern, text identification information and a usage frequency, and each defined insignificant shingle comprises a hash, a shingle pattern, a text portion corresponding to the shingle pattern, and a usage frequency.

20. The product of claim 15, wherein the instructions for determining whether the received message contains spam comprise instructions for performing spam filtering of the reduced set of shingles using at least one of: a Bayes method or a duster filtering method.

* * * * *